United States Patent
Naitoh et al.

(10) Patent No.: US 6,176,621 B1
(45) Date of Patent: Jan. 23, 2001

(54) ROTARY SLIDE BEARING AND PRODUCING METHOD THEREFOR

(75) Inventors: Hiroshi Naitoh; Arihiro Kimura; Koji Kuroda; Hiroshi Murakami; Noriyoshi Ito; Tadashi Tanaka, all of Nagoya (JP)

(73) Assignee: Daido Metal Company Ltd., Nagoya (JP)

( * ) Notice: Under 35 U.S.C. 154(b), the term of this patent shall be extended for 0 days.

(21) Appl. No.: 09/109,080

(22) Filed: Jul. 2, 1998

(30) Foreign Application Priority Data

Sep. 8, 1997 (JP) ........................................ 9-242603

(51) Int. Cl.[7] ................................................ F16C 33/10
(52) U.S. Cl. ........................ 384/291; 384/286; 384/288
(58) Field of Search ................................ 384/91, 97, 100, 384/291, 286, 288

(56) References Cited

U.S. PATENT DOCUMENTS

| | | | |
|---|---|---|---|
| 2,901,297 | * 8/1959 | Sternlicht | 384/291 |
| 3,449,028 | * 6/1969 | De Hart | 384/288 |
| 4,845,817 | * 7/1989 | Wilgus | 29/149.5 |
| 5,009,522 | * 4/1991 | Hahn | 384/288 |

* cited by examiner

Primary Examiner—Paul Thibodeau
Assistant Examiner—Holly Rickman
(74) Attorney, Agent, or Firm—Browdy and Neimark (57) ABSTRACT

A rotary slide bearing part of a rotary slide slit bearing for supporting a rotary shaft thereon in a rotatable manner, has a first bearing surface portion adapted to be arranged adjacent to a second bearing surface portion of another rotary slide bearing part of the rotary slide slit bearing, a load from the shaft to be borne by the first bearing surface portion is larger than a load from the shaft to be borne by the second bearing surface portion, the first bearing surface portion includes a fluidal pressure generating surface facing close to the shaft to generate a fluidal pressure between the fluidal pressure generating surface and the shaft, a main groove arranged at an circumferential end of the first bearing surface portion adjacent to the second bearing surface portion, and a sub-groove extending from the main groove in a circumferential direction of the first bearing surface portion, and an axial width of the sub-groove is smaller than that of the main groove.

11 Claims, 7 Drawing Sheets

ROTARY SLIDE BEARING AND PRODUCING METHOD THEREFOR

BACKGROUND OF THE INVENTION AND RELATED ART STATEMENT

The present invention relates to a rotary slide bearing part of a rotary slide slit bearing for supporting a rotary shaft thereon in a rotatable manner on an axis, and a producing method therefor.

A conventional rotary slide slit bearing has a pair of rotary slide bearing parts to which the rotary slide slit bearing is divided by a split plane in which an axis of the bearing is arranged. At least one of the rotary slide bearing parts has a circumferentially extending groove in a cylindrical bearing surface of the bearing.

OBJECT AND SUMMARY OF THE INVENTION

An object of the present invention is to provide a rotary slide bearing part of a rotary slide slit bearing for supporting a shaft thereon in a rotatable manner on an axis, by which part a cavitation of a lubricant between a bearing surface and the shaft to be borne thereon is restrained, and to provide a method for producing the rotary slide bearing part.

A rotary slide bearing part of a rotary slide slit bearing for supporting a rotary shaft thereon in a rotatable manner, comprises a first bearing surface portion adapted to be arranged adjacent to a second bearing surface portion of another rotary slide bearing part of the rotary slide slit bearing, a load from the shaft to be borne by the first bearing surface portion being larger than a load from the shaft to be borne by the second bearing surface portion, wherein the first bearing surface portion includes a fluidal pressure generating surface facing close to the shaft to generate a fluidal pressure between the fluidal pressure generating surface and the shaft, a main groove arranged at an circumferential end of the first bearing surface portion adjacent to the second bearing surface portion, and a sub-groove extending from the main groove in a circumferential direction of the first bearing surface portion, and an axial width of the sub-groove is smaller than that of the main groove.

A combination of the main groove arranged with a relatively large axial width at the circumferential end of the first bearing surface portion adjacent to the second bearing surface portion, and the sub-groove extending with a relatively small axial width from the main groove in the circumferential direction of the first bearing surface portion releases through the sub-groove to the main groove an abrupt lubricant pressure change or surge caused by a significantly large variation of a load from the shaft or of a position of the shaft on the first bearing surface portion so that a lubricant cavitation is restrained, and prevents a load bearing capacity of the first bearing surface portion from being significantly deteriorated by the release of the pressure from the first bearing surface.

When the second bearing surface portion includes another fluidal pressure generating surface facing close to the shaft to generate a fluidal pressure between the another fluidal pressure generating surface and the shaft, and a lubrication groove arranged adjacent to the first bearing surface portion or the main groove and extending in a circumferential direction of the second bearing surface portion, it is preferable for the axial width of the sub-groove to be smaller than that of the lubrication groove, so that the released abrupt lubricant pressure change or surge from the first bearing surface is absorbed effectively by the lubrication groove.

It is preferable for the sub-groove to extend continuously circumferentially on the first bearing surface in such a manner that both of circumferential ends of the sub-groove communicate fluidally to the second bearing surface portion, so that the abrupt lubricant pressure change or surge from the first bearing surface is released effectively to the second bearing surface portion through both of the circumferential ends of the first bearing surface, and the abrupt lubricant pressure change or surge at a circumferential intermediate or central point of the first bearing surface portion can be released securely.

When the main groove is arranged adjacent to the lubrication groove, the pressure release from the sub-groove is performed more effectively.

It is preferable for a radial depth of the main groove and/or sub-groove from the fluidal pressure generating surface decreases gradually in a direction from the circumferential end of the first bearing surface portion toward the circumferential intermediate or central point of the first bearing surface portion, so that a turbulent flow on the main groove and/or sub-groove is restrained.

When a surface of the rotary shaft moves on the first bearing surface portion from the circumferential end of the first bearing surface portion toward another circumferential end thereof, that is, the surface faces close to the sub-groove just after passing the main groove, the pressure in the sub-groove is kept appropriate. It is preferable for the sub-groove to be prevented from extending axially to an axial end of the first bearing surface portion, so that the pressure in the sub-groove is prevented from decreasing significantly.

When the radial depth of the sub-groove from the fluidal pressure generating surface is minimum at the circumferential or central intermediate point of the first bearing surface portion, the lubricant pressure at the circumferential or central intermediate point of the first bearing surface portion is kept high to increase the load bearing capacity of the first bearing surface portion. It is preferable for an imaginary line extending between or joining both of the circumferential ends of the first bearing surface portion to be prevented from being substantially parallel to a direction of a maximum load.

A method of the present invention for producing a rotary slide bearing part of a rotary slide slit bearing for supporting a rotary shaft in a rotatable manner on an axis, comprises the steps of:

forming a curved bearing surface portion on the rotary slide bearing part, and moving a first machining portion of a machining tool along a first curved machining line to make a main groove circumferentially extending in the curved bearing surface portion, and a second machining portion of the machining tool along a second curved machining line within an axial width of the main groove to form a sub-groove circumferentially extending in the curved bearing surface portion, wherein a curvature radius of the first curved machining line is smaller than that of the second curved machining line, and the axial width of the first machining portion is larger than that of the second machining portion.

The machining tool is a cutter for cutting process, and/or a die(s) of a press machine for plastic deformation process. The curved bearing surface portion may be formed by the cutter, die(s), and/or molding.

Since the curvature radius of the first curved machining line is smaller than that of the second curved machining line, and the axial width of the first machining portion is larger than that of the second machining portion, the main groove and the sub-groove are formed easily without a mechanical interference therebetween.

When a center of curvature of the first curved machining line is substantially identical to that of the second curved machining line, the first and second curved machining lines are easily formed. When a center of curvature of the curved bearing surface portion is apart from centers of curvatures of the first and second machining line, desirable shapes of the main groove and the sub-groove are formed easily. When the center of curvature of the curved bearing surface portion is between the curved bearing surface portion and centers of curvatures of the first and second machining line, desired tapered shapes of the main groove and the sub-groove are formed easily.

When the second curved machining line extends circumferentially in the rotary slide bearing part from a circumferential end of the curved bearing surface portion to another circumferential end thereof to form the sub-groove, a continuous machining along the second curved machining line in the rotary slide bearing part is preformed to increase a life span of the machining tool.

DETAILED DESCRIPTION OF PREFERRED EMBODIMENTS

One preferred embodiment of the present invention, applied to a main shaft for bearing or supporting a crankshaft of an automobile engine, will now be described with reference to FIGS. 1 to 9.

Figure 1:
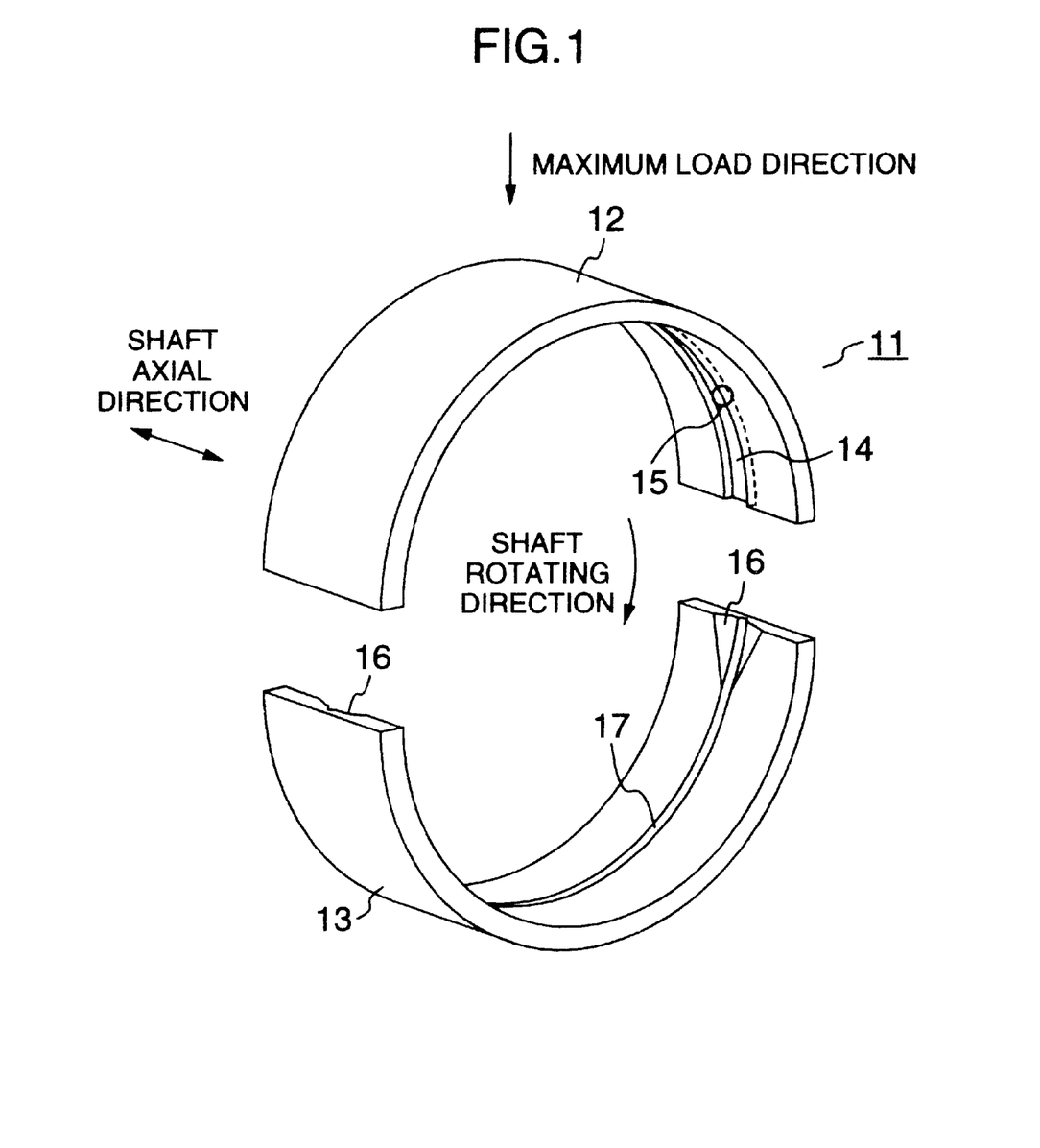
FIG. 1 is an oblique projection view showing an embodiment of a rotary slide bearing part of the invention in a rotary slide slit bearing.

As shown in FIG. 1, this main bearing 11 is constituted by a plurality of (two in this embodiment) separate split-type sliding bearings (hereinafter referred to as "half bearings") 12 and 13, and one half bearing 12 is mounted on a cylinder block while the other half bearing 13 is mounted on a bearing cap. When the bearing cap is fixedly secured to the cylinder block, the two half bearings 12 and 13 jointly constitute the main bearing 11 of a cylindrical shape which bears the crankshaft.

Since an explosion force of fuel, produced within a cylinder, is transmitted to the bearing cap-side half bearing 13 via the crankshaft, a load, larger (higher) than a load acting on the cylinder block-side half bearing 12, is applied to the half bearing 13. Therefore, the bearing cap-side half bearing 13 corresponds to the split-type bearing forming a higher load-bearing sliding surface, to which the present invention is applied.

An oil groove 14 is formed in a sliding surface (inner peripheral surface) of the cylinder block-side half bearing 12, and is disposed centrally of a width thereof, and extends from one end thereof to the other end thereof in a direction of the periphery thereof. The oil groove 14 is open to an outer peripheral surface of the half bearing 12 through an oil hole 15. Two partial grooves 16 are formed respectively in opposite end portions (spaced from each other in the peripheral direction) of the sliding surface of the bearing cap-side half bearing 13, and are disposed centrally of the width of this sliding surface. When the two half bearings 12 and 13 are butted to form the main bearing 11, the two partial grooves 16 are made continuous with the oil groove 14, thereby forming terminal portions of the oil groove 14, respectively.

Thus, although any wide oil groove, which would reduce the area of the sliding surface, is not formed in the sliding surface of the bearing cap-side half bearing 13 which receives a load larger than that received by the cylinder block-side half bearing 12, a narrow or thin groove 17 is formed in the sliding surface of the half bearing 13, and is disposed centrally of the width thereof, and extends in the peripheral direction to interconnect the two partial grooves 16 provided respectively at the opposite end portions of this sliding surface. The width of this narrow groove 17 is set to a very small value on the order of about 1 mm, so that the reduction of the area of the sliding surface is kept to a minimum. The half bearing 13 has an inner diameter of about 80 mm and a width of about 37 mm.

Lubricating oil is supplied to the main bearing 11, constituted by the two half bearings 12 and 13, via the oil hole 15. The lubricating oil, supplied to the oil hole 15, flows to the partial grooves 16 through the oil groove 14. Thus, the lubricating oil is supplied to the sliding surfaces of the two half bearings 12 and 13. The lubrication of the main bearing 11 is effected in this manner.

Figure 2A:
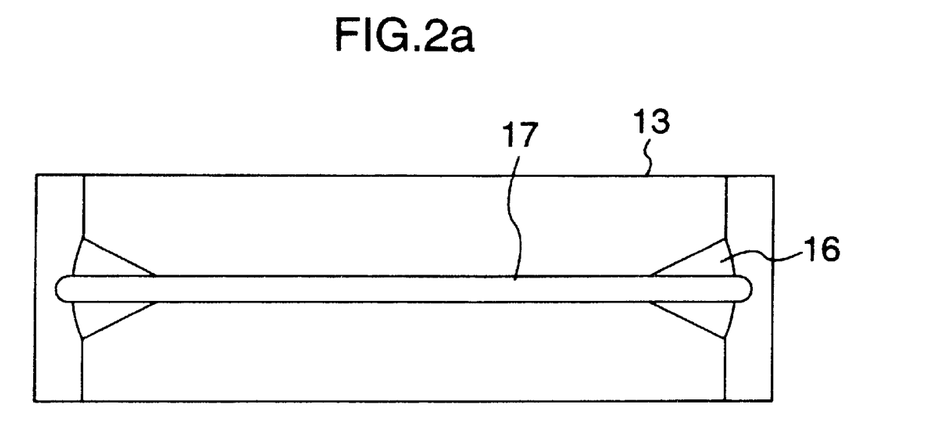
FIG. 2a is a front view of the rotary slide bearing part.
Figure 2B:
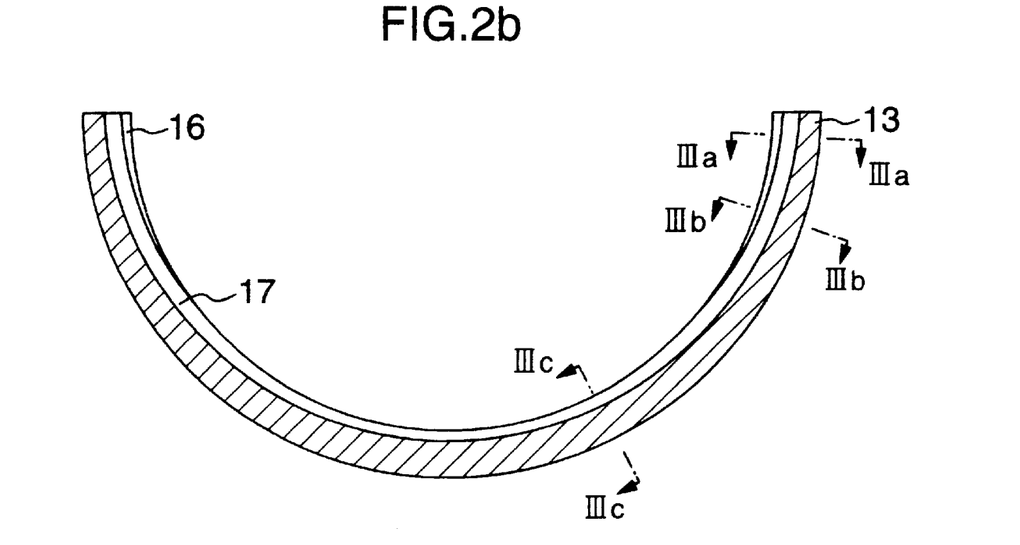
FIG. 2b is a cross-sectional side view of the rotary slide bearing part.

As shown in FIG. 2(a), each of the partial grooves 16 is formed into a generally triangular shape decreasing in width progressively from the corresponding end surface of the half bearing 13 toward the opposite end surface thereof. As shown in FIG. 2(b), the depth of the partial groove 16 is decreasing progressively from the corresponding end surface toward the opposite end surface. With respect to a transverse cross-section of the partial groove 16, it has an arcuately-concave shape having a deep central portion.

Figure 3A:
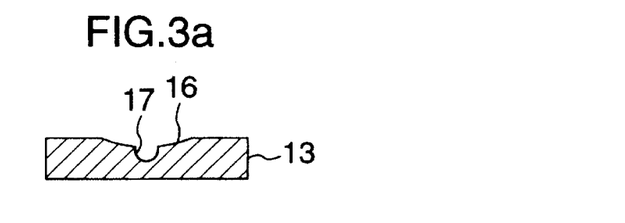
FIG. 3a is a cross-sectional view of the rotary slide bearing part taken along line IIIa—IIIa in FIG. 2b.
Figure 3B:
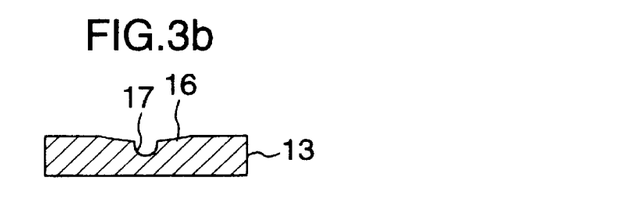
FIG. 3b is a cross-sectional view of the rotary slide bearing part taken along line IIIb—IIIb in FIG. 2b.
Figure 3C:
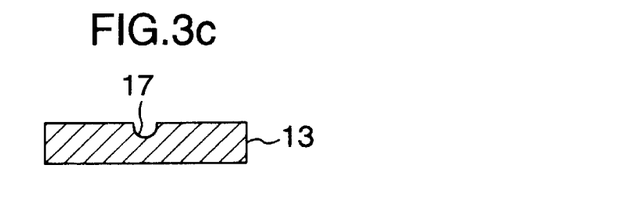
FIG. 3c is a cross-sectional view of the rotary slide bearing part taken along line IIIc—IIIc in FIG. 2b.

The narrow groove 17 is formed not only in that portion of the sliding surface of the half bearing 13, lying between the two partial grooves 16 (provided respectively at the opposite end portions of the half bearing 13) but also in the bottom of each partial groove 16. The depth of that portion of the narrow groove 17, disposed in each partial groove 16 is constant, and the narrow groove 17 is decreasing in depth progressively from each partial groove 16 toward the peripherally-central portion of the half bearing 13. The bottom of the narrow groove 17 has a semi-circular cross-section as shown in FIG. 3(c).

When the crankshaft moves in upward, downward, right and left directions in the main bearing 11 (having the bearing cap-side half bearing 13 of the above construction) during the idling of the engine and at the time of starting the automobile, a pressure of an oil film on the sliding surface varies (that is, increases and decreases). The oil groove 14 is formed in the sliding surface of the cylinder block-side half bearing 12, and is disposed centrally of the width thereof, and therefore when the pressure of the oil film increases, the lubricating oil on this sliding surface escapes into the oil groove 14. Also, the narrow groove 17 is formed in the sliding surface of the bearing cap-side half bearing 13, and is disposed centrally of the width thereof, and therefore when the pressure of the oil film increases, the lubricating oil on this sliding surface escapes into the narrow groove 17.

As a result, not only in the cylinder block-side half bearing 12, subjected to a relatively low bearing pressure, but also in the bearing cap-side half bearing 13 subjected to a high bearing pressure since the explosion force of the fuel, produced within the cylinder, is transmitted thereto, an abnormal increase of the oil film pressure or a large variation of the oil film pressure is prevented. As a result, the generation of a cavitation phenomenon, in which bubbles, contained in the lubricating oil, are crushed, is prevented, and therefore the generation of cracking sounds or noises as a result of crushing of the bubbles is effectively prevented.

In a diesel engine, the pressure of explosion of fuel is high, and besides a high-output design of an engine has recently been required regardless of whether it is a diesel engine or a gasoline engine. In view of these, the construction of the present invention is best suited for suppressing the cavitation in a diesel engine and a high-output engine since the generation of the cavitation is prevented by the narrow groove 17 which does not much reduce the area of the sliding surface, as described above.

Next, a method of producing the bearing cap-side half bearing 13, and particularly a method of forming the partial grooves 16 and the narrow groove 17 will be described.

The partial grooves 16 and the narrow groove 17 are formed by cutting the relevant portions of the sliding surface of the half bearing 13 beforehand formed or processed into a semi-circular shape. The partial grooves 16 are different in width from the narrow groove 17, and therefore the partial grooves 16 and the narrow groove 17 are usually formed at different steps, using different cutters. This increases the cost, and therefore is disadvantageous.

In the production method of the present invention, however, the partial grooves 16 and the narrow groove 17 can be formed or cut in one step, and therefore the increase of the cost can be suppressed.

Figure 7:
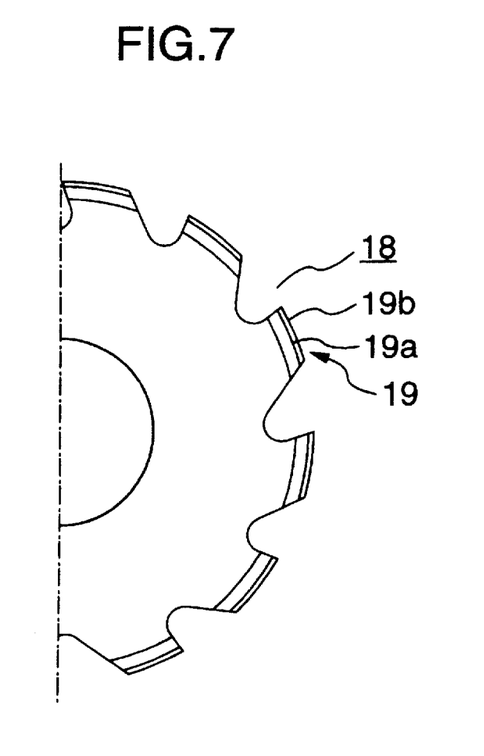
FIG. 7 is a front view of the cutter.
Figure 8:
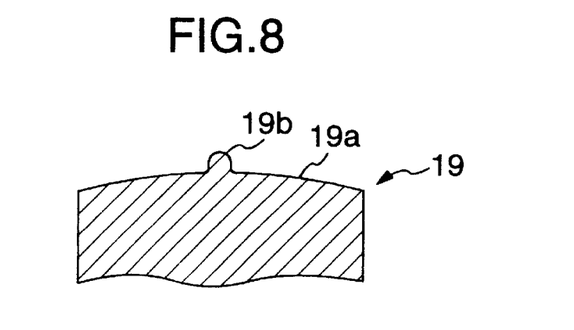
FIG. 8 is a cross-sectional partial view of the cutter.

The partial grooves 16 and the narrow groove 17 are formed by cutting, using a milling cutter (rotary cutter) 18 shown in FIG. 7. This milling cutter 18 has many blades 19 formed at an outer peripheral portion thereof, and each blade 19 has a first blade portion 19a, conforming in transverse cross-section to the partial groove 16, and a second blade portion 19b which is formed on and projects radially outwardly from a widthwise-central portion of the first blade portion 19a, and conforms in transverse cross-section to the narrow groove 17.

The width of the first blade portion 19a of an arcuately-convex shape is larger than the maximum width of the partial groove 16 so that any step portion will not be formed between the partial groove 16 and the sliding surface.

Figure 9:
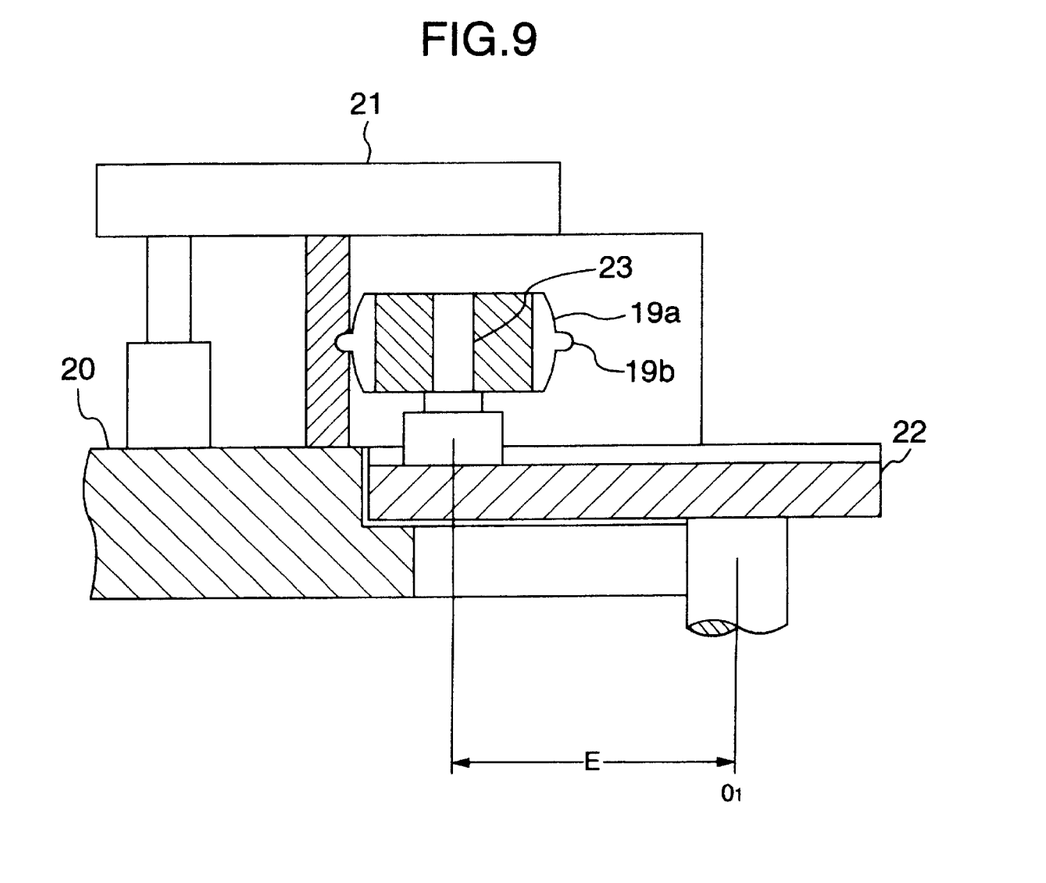
FIG. 9 is a partially cross-sectional schematic view of a machine tool on which the cutter and the rotary slide bearing part are mounted.

As shown in FIG. 9, a machine tool for forming the partial grooves 16 and the narrow groove 17 by the use of the milling cutter 18 comprises a clamp 21 for fixing the half bearing 13 on a table 20, a tool rest 22 rotatable in a direction of the periphery of the half bearing 13 fixed by the clamp 21, and a rotation shaft 23 mounted on the tool rest 22 in eccentric relation thereto. The position of the rotation shaft 23 can be adjusted so that the distance (eccentric amount) E between this rotation shaft 23 and an axis O1 of rotation of the tool rest 22 can be changed.

Figure 4:
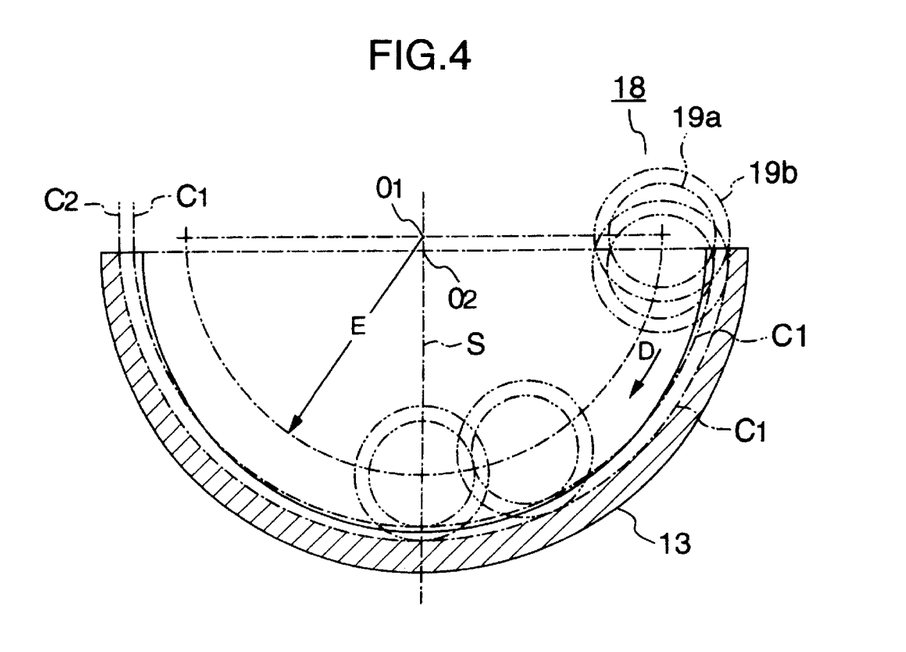
FIG. 4 is a cross-sectional side view of the rotary slide bearing part during forming grooves by a cutter.

For forming the partial grooves 16 and the narrow groove 17 by this machine tool, the half bearing 13 is fixed in eccentric relation to the axis O1 of rotation of the tool rest 22 as shown in FIG. 4, and then the tool rest 22 is rotated at a low speed while rotating the rotation shaft 23, so that the milling cutter 18, while rotating about the axis of the rotation shaft 23, revolves (that is, makes an orbital circular motion) around the rotation axis O1 of the tool rest 22.

At this time, the amount of eccentricity of the rotation shaft 23 from the rotation axis O1 of the tool rest 22 is so determined (in view of the width and length of the partial grooves 16) that when effecting the orbital circular motion of the milling cutter 18, while rotating it, so as to machine or cut the half bearing 13, a radius of a circumscribed envelope C1 for orbits of rotation of the first blade portions 19a is slightly larger than the radius of the sliding surface of the half bearing 13 so as to form the partial grooves 16.

If the center O2 of curvature of the sliding surface of the half bearing 13 is fixed at a position, coinciding with the center (axis) O1 of orbital circular motion of the milling cutter 18, when effecting the orbital circular motion of the milling cutter 18 while rotating it, the blades 19 of the milling cutter 18 create a cut of a constant depth in the sliding surface of the half bearing 13 over the entire periphery thereof, and as a result a wide groove is formed in a widthwise-central portion of the sliding surface over the entire periphery thereof by the first blade portions 19a, and also a narrow groove is formed in the bottom of this wide groove by the second blades 19b.

On the other hand, when the half bearing 13 is made eccentric a predetermined amount relative to the axis O1 of orbital circular motion of the milling cutter 18, the depth of cutting of the sliding surface by the milling cutter 18 varies in accordance with the position of the orbiting milling cutter 18, as shown in FIG. 4.

More specifically, the center O2 of curvature of the half bearing 13 is offset the predetermined amount from a position (where this center O2 coincides with the axis O1 of orbital circular motion) along a straight line S, passing through the curvature center O2, and bisecting the half bearing 13, in such a manner that the axis O1 of orbital circular motion is disposed outwardly of the half bearing 13.

In this embodiment, the half bearing 13 is thus held in the eccentric position, and in this condition the milling cutter 18 is caused to make an orbital circular motion, for example, in a direction of arrow D (FIG. 4) while rotating it. As a result, the amount (depth) of cutting of the sliding surface of the half bearing 13 by the milling cutter 18 is so varied that this cutting amount is decreasing progressively from the cutting-starting end toward a peripherally-central portion of the sliding surface, and then is increasing progressively from the peripherally-central portion toward the cutting-finishing end.

Figure 5:
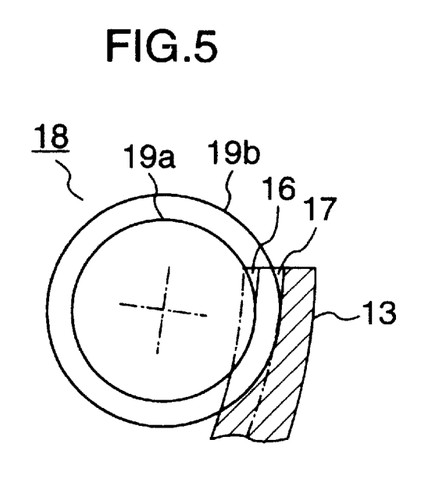
FIG. 5 is a cross-sectional partial side view of the rotary slide bearing part during forming a main groove.

Namely, the envelope C1 for the first blade portions 19a overlaps only the opposite end portions of the sliding surface of the half bearing 13, and an envelope C2 for the second blade portions 19b overlaps the sliding surface of the half bearing 13 over the entire periphery thereof. Therefore, when the milling cutter 18 is caused to make an orbital circular motion (that is, revolved) in the direction of arrow D, the partial groove 16 is first formed in one end portion of the half bearing 13 (which partial groove 16 is decreasing in depth progressively toward the other end portion of the half bearing 13), and at the same time the narrow groove 17 begins to be formed in the bottom of this partial groove 16, as shown in FIG. 5.

Figure 6:
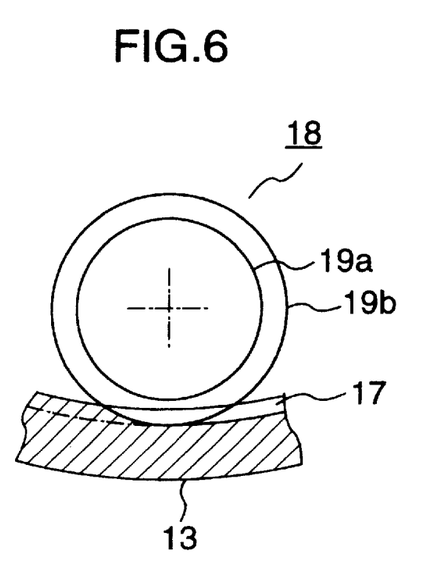
FIG. 6 is a cross-sectional partial side view of the rotary slide bearing part during forming a sub-groove.

Then, when the milling cutter 18 is revolved to a predetermined position, the first blade portions 19a are brought out of cutting engagement with the sliding surface of the half bearing 13, and thereafter only the narrow groove 17 continues to be formed in the sliding surface, and this narrow groove 17 is decreasing in depth progressively. When the milling cutter 18 is revolved to the peripherally-central portion of the sliding portion of the half bearing 13, the depth of cutting of the narrow groove 17 by the second blade portions 19b becomes the smallest, and then the depth of cutting of the narrow groove 17 by the second blade portions 19b is increasing progressively until the milling cutter 18 is revolved to a position near to the other end portion of the half bearing 13.

When the milling cutter 18 is revolved to the position near to the other end portion of the half bearing 13, the first blade portions 19a again begin to cut or form the partial groove 16 in the other end portion, and at the same time the second blade portions 19b continues to form the narrow groove 17 in the bottom of this partial groove 16. When the milling cutter 18 is brought out of engagement with the other end portion of the half bearing 13, the formation of the partial groove 16, as well as the formation of the narrow groove 17, is finished.

In this embodiment, the partial grooves 16 and the narrow groove 17 are formed by the above cutting method, and therefore the partial groove 16 and the narrow groove 17 can be both formed at the same time, and this enhances the productivity.

Figure 10:
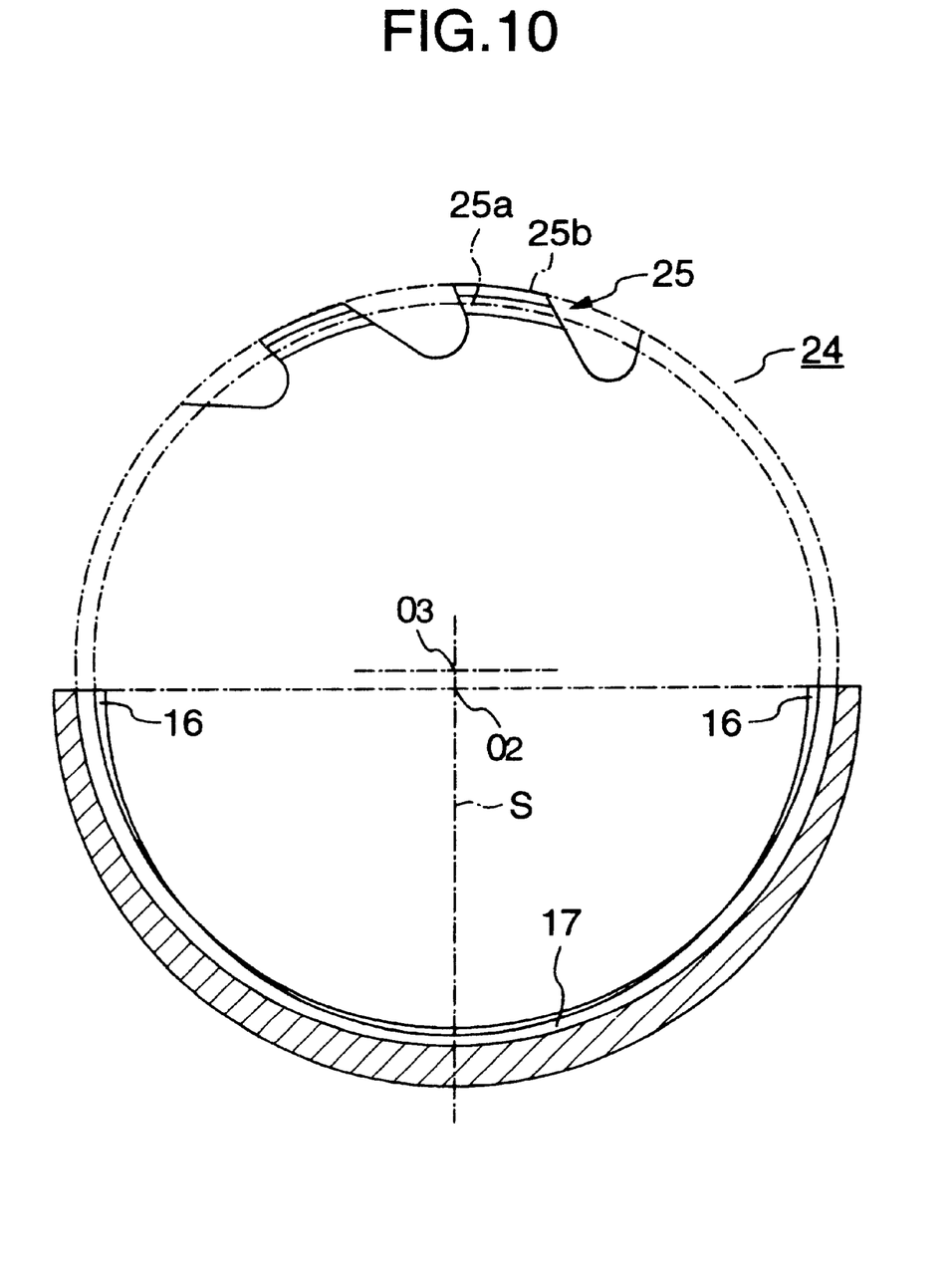
FIG. 10 is a cross-sectional side view of the rotary slide bearing part during forming the grooves by another cutter.

FIG. 10 shows another embodiment of the invention in which the partial grooves 16 and the narrow groove 17 are formed by a different method. In this embodiment, the partial grooves 16 and the narrow groove 17 are formed at the same time, using a milling cutter (rotary cutter) 24 having a diameter larger than the diameter of the sliding surface of the half bearing 13.

Many blades 25 are formed at an outer peripheral portion of the milling cutter 24, and like the blades 19 of the milling cutter 18 of the first embodiment, each blade 25 has a first blade portion 25a, conforming in transverse cross-section to the partial groove 16, and a second blade portion 25b which is formed on and projects radially outwardly from a widthwise-central portion of the first blade portion 25a, and conforms in transverse cross-section to the narrow groove 17. A diameter, defined by the first blade portions 25a, is equal to the diameter of the envelope C1 for the first blade portions 19a of the first embodiment, and a diameter, defined by the second blade portions 25b, is equal to the diameter of the envelope C2 for the second blade portions 19b of the first embodiment.

For forming the grooves 16 and 17 by this milling cutter 24, the half bearing 13 is fixed to a table of a machine tool, and the milling cutter 24 is mounted on a rotation shaft of a tool rest. The tool rest is linearly movable such that the rotation shaft can be moved along a straight line S which passes through the center O2 of curvature of the half bearing 13, and bisects the half bearing 13.

In this condition, the tool rest is linearly moved while rotating the milling cutter 24. As a result, the milling cutter 24 gradually approaches the half bearing 13, and first, the peripherally-opposite end portions of the sliding surface are cut by the second blade portions 25b, so that the narrow groove 17 begins to be formed, and the regions (cutting regions) where the narrow groove 17 is cut or formed by the second blade portions 25b are increasing progressively toward a peripherally-central portion of the half bearing 13 in accordance with the linear movement of the tool rest.

The narrow groove 17 is formed by cutting in this manner, and the depth of the narrow groove 17 gradually increases with the increase of the cutting regions, and then the first blade portions 25a begin to cut the peripherally-opposite end portions of the sliding surface of the half bearing 13 to form the partial grooves 16. Then, when the axis O3 of rotation of the milling cutter 24 reaches a position rearwardly offset a predetermined amount (distance) from the center O2 of curvature of the half bearing 13, the linear movement of the tool rest is stopped. As a result, the two partial grooves 16 are formed respectively in the opposite end portions of the half bearing 13 (each of the partial grooves 16 is decreasing in depth progressively toward the opposite end portion), and also the narrow groove 17 is formed in that portion of the sliding surface lying between the two partial grooves 16. Thus, the grooves 16 and 17 can be formed at the same time.

The present invention is not limited to the above embodiments illustrated in the drawings, but the following modifications can be made.

The partial groove 16 may be formed in only one (disposed ahead of the other in the direction of rotation of the shaft) of the peripherally-opposite end portions. In this case, with respect to the embodiment of FIG. 4, the half bearing 13 is further offset from its position of FIG. 4 in a direction perpendicular to the straight line S, or the axis O1 of orbital circular motion of the milling cutter 18 is offset on a straight line interconnecting the opposite ends of the half bearing 13 through the curvature center O2, and with this construction, the first blade portions 19a cut only one end portion of the sliding surface. With resect to the embodiment of FIG. 10, the half bearing 13 is further offset from its position of FIG. 10 in a direction perpendicular to the straight line S, or the axis O3 of rotation of the milling cutter 24 is offset on a straight line interconnecting the opposite ends of the half bearing 13 through the curvature center O2, and with this construction, the first blade portions 25a cut only one end portion of the sliding surface. Thus, the partial groove 16 and the narrow groove 17 can be formed at the same time.

Figure 11:
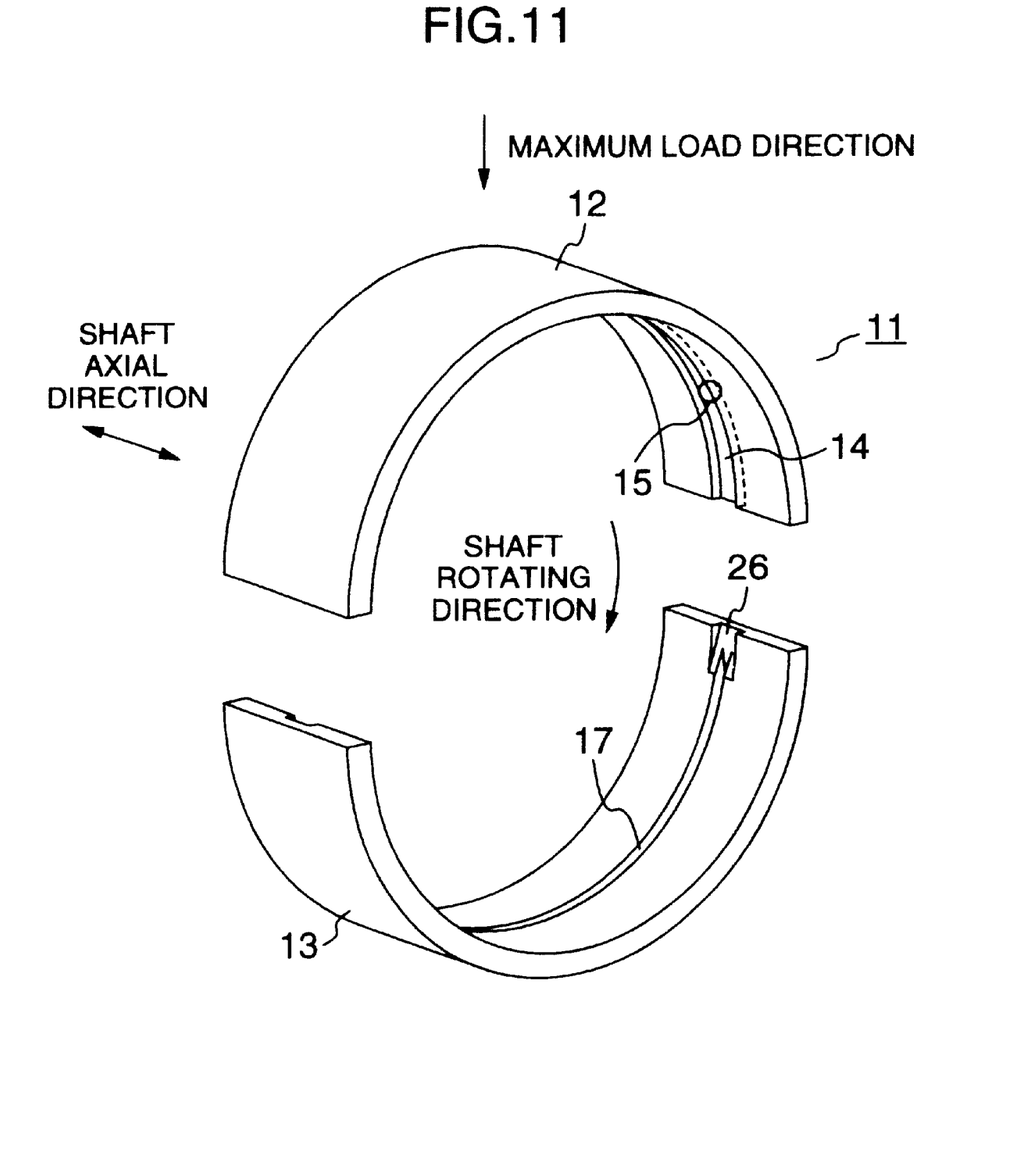
FIG. 11 is an oblique projection view showing another embodiment of the rotary slide bearing part of the invention.

If the partial grooves 16 and the narrow groove 17 are cut or formed separately, there may be used a method (a further embodiment of the invention) shown in FIG. 11, in which partial grooves 26, similar to those in a conventional half bearing, are formed respectively in peripherally-opposite end portions of a sliding surface of a bearing cap-side half bearing 13, and a narrow groove 17 is formed in that portion of the sliding surface, lying between the two partial grooves 26, and extends in a peripheral direction.

The present invention is not limited to a main bearing of an engine, but can be applied to various sliding bearings (in which a plurality of split-type sliding bearings cooperate with each other to form the sliding bearing of a cylindrical shape, and a load, acting on the sliding bearing during the rotation of a shaft, is different or uneven in the direction of the periphery of the sliding bearing), and more particularly to those split-type sliding bearings which bear a higher load.

What is claimed is:

1. A rotary slide bearing part of a rotary slide slit bearing for supporting a rotary shaft thereon in a rotatable manner, comprising a first bearing surface portion for arrangement adjacent to a second bearing surface portion of another rotary slide bearing part of the rotary slide slit bearing, a load from the shaft to be borne by the first bearing surface portion being larger than a load from the shaft to be borne by the second bearing surface portion, wherein the first bearing surface portion includes a fluidal pressure generating surface facing adjacent the shaft to generate a fluidal pressure between the fluidal pressure generating surface and the shaft, a main groove arranged at a circumferential end of the first bearing surface portion adjacent to the second bearing surface portion, and a sub-groove extending in line with and from the main groove in a circumferential direction of the first bearing surface portion, and an axial width of the sub-groove is smaller than that of the main groove.

2. A rotary slide bearing part according to claim 1, wherein the second bearing surface portion includes another fluidal pressure generating surface facing adjacent the shaft to generate a fluidal pressure between the another fluidal pressure generating surface and the shaft, and a lubrication groove arranged adjacent to the first bearing surface portion and extending in a circumferential direction of the second bearing surface portion, and the axial width of the sub-groove is smaller than that of the lubrication groove.

3. A rotary slide bearing part according to claim 1, wherein the sub-groove extends continuously circumferentially on the first bearing surface in such a manner that both of circumferential ends of the sub-groove communicate fluidally to the second bearing surface portion.

4. A rotary slide bearing part according to claim 1, wherein the second bearing surface portion includes another fluidal pressure generating surface facing close to the shaft to generate a fluidal pressure between the another fluidal pressure generating surface and the shaft, and a lubrication groove arranged adjacent to the first bearing surface portion and extending in a circumferential direction of the second bearing surface portion, and the main groove is arranged adjacent to the lubrication groove.

5. A rotary slide bearing part according to claim 1, wherein a radial depth of the main groove from the fluidal pressure generating surface decreases in a direction from the circumferential end of the first bearing surface portion toward a circumferential intermediate point of the first bearing surface portion between the circumferential end of the first bearing surface portion and another circumferential end thereof.

6. A rotary slide bearing part according to claim 1, wherein a radial depth of the sub-groove from the fluidal pressure generating surface decreases in a direction from the circumferential end of the first bearing surface portion toward a circumferential intermediate point of the first bearing surface portion between the circumferential end of the first bearing surface portion and another circumferential end thereof.

7. A rotary slide bearing part according to claim 1, wherein a surface of the rotary shaft moves on the first bearing surface portion from the circumferential end of the first bearing surface portion toward another circumferential end thereof.

8. A rotary slide bearing part according to claim 1, wherein the sub-groove is prevented from extending axially to an axial end of the first bearing surface portion.

9. A rotary slide bearing part according to claim 1, wherein a radial depth of the sub-groove from the fluidal pressure generating surface is minimum at a circumferential intermediate point of the first bearing surface portion between the circumferential end of the first bearing surface portion and another circumferential end thereof.

10. A rotary slide bearing part according to claim 1, wherein an imaginary line extending between the circumferential end of the first bearing surface portion and another circumferential end thereof is prevented from being substantially parallel to a direction of a maximum load.

11. A rotary slide bearing part of a rotary slide slit bearing for rotatably supporting a rotary shaft, comprising a first bearing surface portion adjacent a second bearing surface portion of another rotary slide bearing part of the rotary slide slit bearing, wherein a load from the shaft to be borne by the first bearing surface portion is larger than a load from the shaft to be borne by the second bearing surface portion, the first bearing surface portion including a fluidal pressure generating surface in facing relationship and adjacent the shaft to generate fluidal pressure between the fluidal pressure generating surface and the shaft, a main groove arranged at a circumferential end of the first bearing surface portion adjacent the second bearing portion, and a sub-groove contiguous with and a part of said main groove extending from said main groove in a circumferential direction of the first bearing surface portion, said sub-groove having an axial width which is smaller than that of said main groove.

* * * * *